3,421,905
METHOD FOR IMPROVING AND INCREASING THE FLAVOR OF FOODS BY THE ADDITION OF DEOXYNUCLEOSIDES
Mao Hsun Yueh, Minneapolis, Minn., assignor to General Mills, Inc., a corporation of Delaware
No Drawing. Filed Apr. 4, 1966, Ser. No. 539,622
U.S. Cl. 99—140  8 Claims
Int. Cl. A23l 1/26

The present invention relates to a process for improving and increasing the flavor of foods by the addition thereto of deoxynucleosides.

A number of compounds have been used in the past as flavor enhancers. These include the nucleotides and deoxynucleotides. The nucleosides have been tried for this function but have not been effective for this purpose. Moreover, some workers in this field have expressed the view that not only is the phosphate moiety necessary in the molecule, but also its position in the molecule is important. It has now been discovered that despite the fact that the phosphate moiety has been considered essential and despite the fact that the nucleosides are ineffective as flavor enhancers, the deoxynucleosides are effective and valuable flavor enhancers. Moreover, in some instances, the deoxynucleosides are better than the nucleotides or deoxynucleotides for the reason that with some individuals, the latter compounds leave some bitter aftertaste which was not detectable with the deoxynucleosides.

It is an object of the present invention therefore to provide a novel process for improving or increasing the flavor of foods by the addition thereto of deoxynucleosides. It is also an object of the present invention to provide novel food products in which the flavor is improved or increased by the addition of deoxynucleosides.

The deoxynucleosides which may be employed in the present invention are the deoxyribonucleosides. Either the 2'-deoxy or the 3'-deoxynucleosides may be employed. Typical nucleosides which may be used in the present invention include the following: 2'-deoxy adenosine, 3'-deoxy adenosine, 2'- deoxy guanosine, 2'-deoxy inosine, 2'-deoxy thymidine and 2'-deoxy cytidine. Some of these contain the purine base and some the pyrimidine base. Of these, the nucleosides with the purine base are preferred as are the 2'-deoxynucleosides.

These nucleosides may be used in virtually any food product including meat products, dairy products, vegetables, soups, sauces and the like. They may be used alone or in mixtures and frequently it is desirable to use them with other flavor intensifiers such as monosodium glutamate or other amino acids. The quantity employed can vary from an extremely minute quantity such as 0.001% based on the weight of the food product up to as high as 0.1% and even higher quantities, up to about 0.2% and higher. However, in view of the cost of these materials it is generally preferable not to employ them in excess of 0.02%. In use it is merely necessary to incorporate these flavor enhancers into the food product at any stage in the processing or preparation.

The following examples will illustrate the invention and are to be considered illustrative and not limiting the same.

EXAMPLE I

The flavoring materials indicated in the following table were prepared and then mixed with 200 g. of canned peas. The resulting samples were evaluated organoleptically by an experienced panel and the results are given in the following table:

| Flavoring material | Results |
|---|---|
| (1) 120 mg. MSG (monosodium glutamate). | Control. |
| (2) 114 mg. MSG+6 mg. deoxyguanosine. | Definite flavor enhancement over No. 1. |
| (3) 114 mg. MSG+6 mg. deoxyadenosine. | Comparable to No. 2. |
| (4) 114 mg. MSG+6 mg. deoxycytidine. | Do. |
| (5) 114 mg. MSG+6 mg. deoxyinosine. | Do. |

EXAMPLE II

Deoxyguanosine was added to 240 g. of white sauce and compared with a control. These samples were then evaluated organoleptically as in Example I with the results indicated in the following table:

| Flavoring material | Results |
|---|---|
| (1) 120 mg. MSG | Control. |
| (2) 114 mg. MSG+6 mg. deoxyguanosine. | Definite flavor enhancement over No. 1. |

EXAMPLE III

Some of the flavoring materials described in Example I were added at 0.008% weight level to 37.5 g. of a commercially available canned chicken broth which contained an unspecified amount of monosodium glutamate. Results obtained from organoleptic evaluations of these samples are listed as follows:

| Flavoring material* | Results |
|---|---|
| (1) None | Control. |
| (2) Deoxyguanosine | Definite enhancement. |
| (3) Deoxyinosine | Do. |
| (4) Deoxyadenosine | Do. |

*All dissolved in 0.5 ml. aqueous $H_3PO_4$ containing 6.84 mg. $H_3PO_4$.

EXAMPLE IV

3'-deoxyadenosine was evaluated organoleptically in commercially available canned peas. 40 g. of pea juice was used.

| Flavoring material* | Results |
|---|---|
| (1) 30 mg. MSG | Control. |
| (2) 28 mg. MSG+2 mg. 3'-deoxyadenosine. | Pronounced enhancement over No. 1. |

*Dissolved in 0.5 ml. aqueous $H_3PO_4$ containing 6.84 mg. $H_3PO_4$.

EXAMPLE V

Some of the flavoring materials described in Example I were added at a weight level of 0.008% to 37.5 g. of a commercially available cheese spread. The samples were evaluated with soda crackers organoleptically.

| Flavoring material* | Results |
|---|---|
| (1) None | Control. |
| (2) Deoxyguanosine | Definite enhancement. |
| (3) Deoxyadenosine | Do. |
| (4) Deoxyinosine | Do. |

*All dissolved in 0.5 ml. $H_3PO_4$ containing 6.84 mg. $H_3PO_4$.

While the above description has been with particular reference to the specific examples, it is to be understood that the invention is not restricted thereto but may be varied within the scope of the appended claims.

The embodiments of the invention in which an exclusive property or privilege is claimed are defined as follows:

1. Process for enhancing the flavor of food products which comprises adding thereto a deoxyribonucleoside in a flavor enhancing amount.

2. Process according to claim 1 in which the ribonucleoside is a 2'-deoxyribonucleoside.

3. Process according to claim 1 in which the ribonucleoside is a 3'-deoxyribonucleoside.

4. Process according to claim 1 in which the deoxyribonucleoside is employed in the level of 0.001% to 0.2% based on the weight of the food product.

5. A food product containing therein a flavor enhancing amount deoxyribonucleoside.

6. A product according to claim 5 in which the ribonucleoside is a 3'-deoxyribonucleoside.

7. A product according to claim 5 in which the ribonucleoside is 2'-deoxyribonucleoside.

8. A product according to claim 5 in which the deoxyribonucleoside is employed in a quantity of from 0.001% to 0.2% based on the weight of the food product.

References Cited

UNITED STATES PATENTS 3,198,638   8/1965   Yasumatsu et al. _____ 99—140

ALVIN E. TANENHOLTZ, *Primary Examiner.*